STIMULATED EMISSION SEMICONDUCTOR DEVICES

Filed Oct. 24, 1962 2 Sheets-Sheet 1

Inventor:
Robert N. Hall,
by John F. Ahern
His Attorney.

STIMULATED EMISSION SEMICONDUCTOR DEVICES

Filed Oct. 24, 1962 2 Sheets-Sheet 2

Inventor:
Robert N. Hall,
by John F. Ahern
His Attorney.

3,245,002
STIMULATED EMISSION SEMICONDUCTOR DEVICES

Robert N. Hall, Schenectady, N.Y., assignor to General Electric Company, a corporation of New York
Filed Oct. 24, 1962, Ser. No. 232,846
10 Claims. (Cl. 331—94.5)

The present invention relates to the generation of stimulated coherent radiation, and more patricularly to such generation utilizing semiconductor devices.

Stimulated coherent radiation of light, not necessarily visible but infrared as well, and also of microwave frequencies, has been obtained from crystals of ruby and other similar substances and from gases as well. Such emission has, however, been subject to low efficiencies and has required extremely complicated equipment.

Accordingly, one object of the present invention is to provide a source of stimulated coherent radiation which is of simple construction.

Another object of the invention is to provide a source of stimulated coherent radiation having high efficiencies.

Still another object of the present invention is to provide semiconductor devices adapted to serve as sources of stimulated coherent radiation.

Briefly stated, in accord with my invention, I provide semiconductor diode devices adapted for the production of stimulated coherent radiation and including degenerately impurity impregnated or doped N and P-type regions separated by a very thin intermediate or junction region. Two surfaces perpendicular to the plane of the intermediate or junction region are accurately polished to exact parallelism and are located at a distance from one another to facilitate the existence of a standing wave pattern therebetween.

When the diode so formed is subjected to a forward bias at extremely high current densities, coherent electromagnetic radiation is emitted laterally through the polished surfaces. This radiation is of narrow wavelength and high efficiency. In accord with one preferred embodiment of my invention direct transition semiconductive compounds are utilized and coherent visible and infrared light radiation is obtained.

Figures 1, 2, 3, 4:
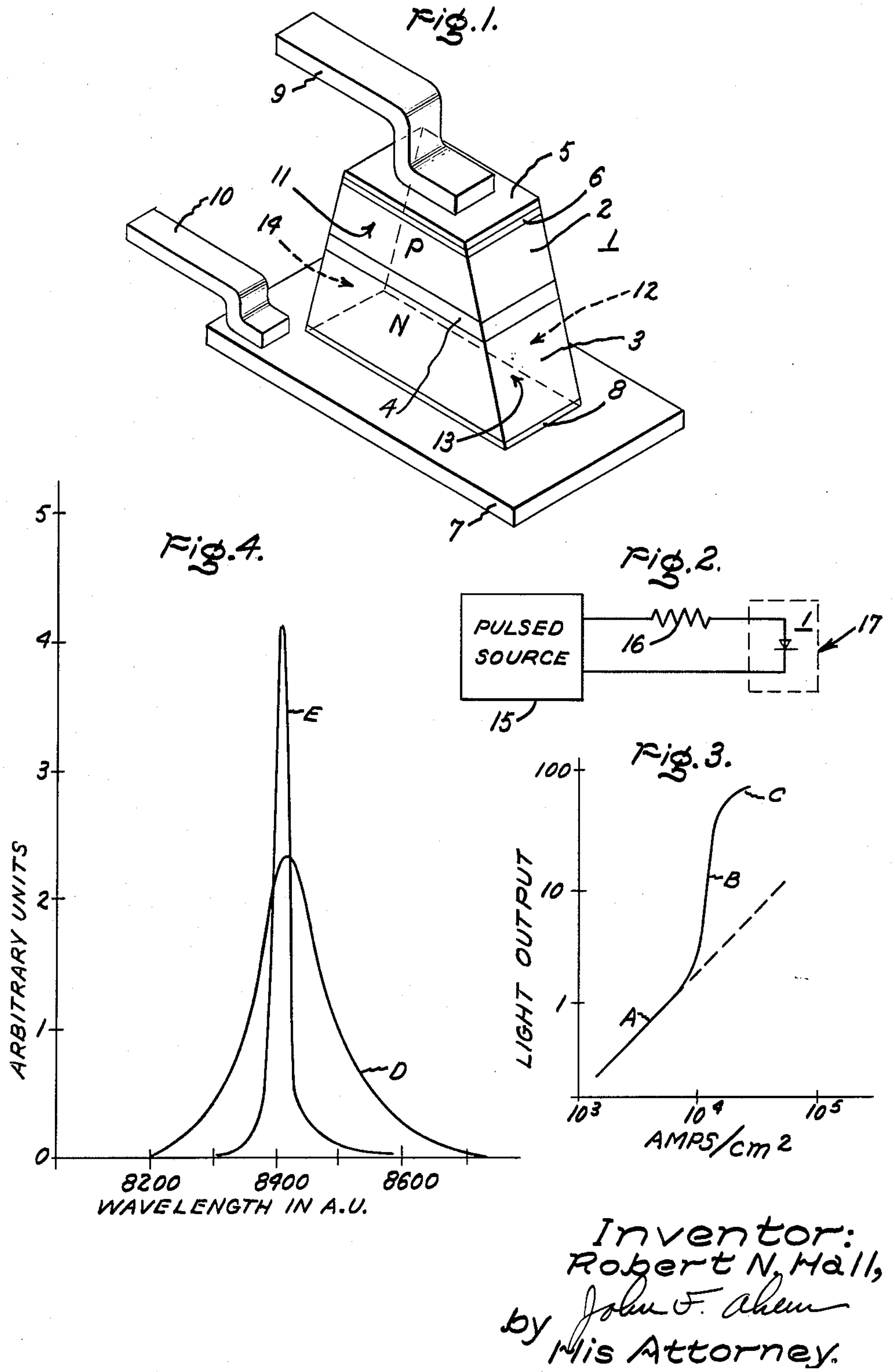
Figure 5:
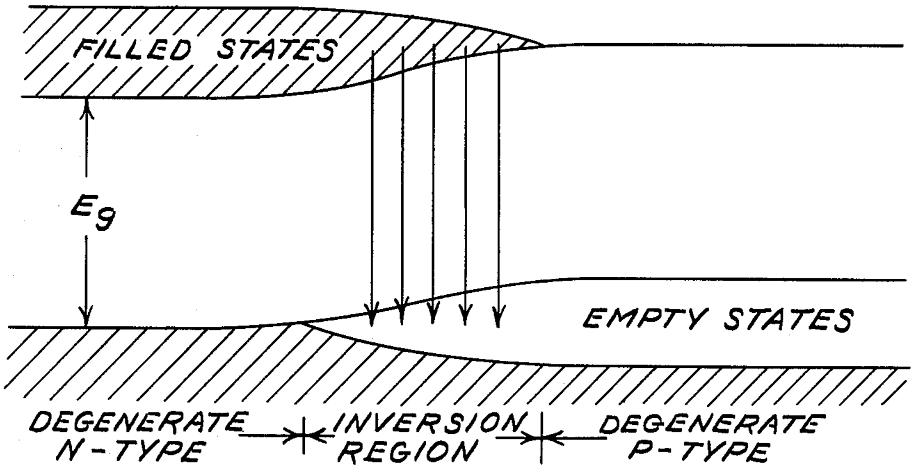
Figure 6:
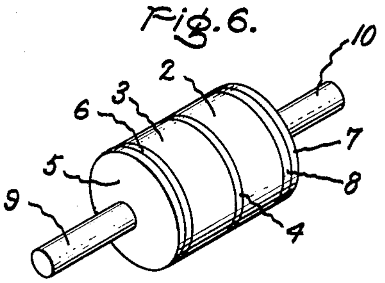
Figure 7:
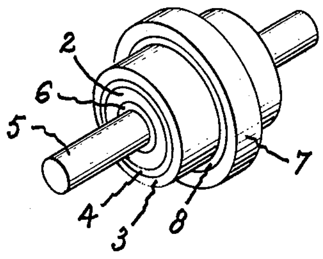

The novel features which are characteristic of the present invention are set forth with particularly in the appended claims. The invention itself, together with further objects and advantages thereof may best be understood with reference to the following detailed description taken in connection with the drawings in which:

FIGURE 1 is a perspective view of a typical device constructed in accord with the invention, FIGURE 2 is a schematic diagram of an operating circuit for operating the device of FIGURE 1, FIGURE 3 is a graph of the emission from a device such as that illustrated in FIGURE 1, and indicating the presence of a threshold for stimulated coherent emission therefrom, FIGURE 4 is a graph illustrating the waveform of the emission from a device such as that of FIGURE 1 and gives proof of coherence, FIGURE 5 is a generalized energy level diagram for the semiconductive materials utilized which illustrate the physical phenomenon responsible for the operation of devices of the invention, and FIGURES 6 and 7 are semi-schematic drawings of alternative configurations for devices in accord with the invention.

FIGURE 1 of the drawings illustrates a semiconductor diode constructed in accord with the present invention and adapted for emitting stimulated coherent radiation. The device of FIGURE 1 comprises a crystal of semiconductive material indicated generally at 1 having a degenerately impregnated or doped P-type region 2 and a degenerately impregnated or doped N-type region 3, these regions being separated by a P–N junction region 4. Nonrectifying contact is made between the P-type region 2 and a first electrode 5 by means of an acceptor type or electrically neutral solder layer 6 and a non-rectifying connection is made between N-type region 3 and a second electrode 7 by means of a donor type or electrically neutral solder layer 8. Electrode connectors 9 and 10 are connected to electrodes 5 and 7 respectively as, for example, by welding, brazing, etc.

As illustrated in FIGURE 2 of the drawing, the semiconductor diode may be activated to the emission of stimulated coherent radiation by the application of a forward bias, as for example, by the connection to a source of direct current of sufficiently high current capacity to cause the production of coherent radiation. In FIGURE 2 such a pulsed source is illustrated schematically as 15 and is connected to diode 1 through a series limiting resistor 16. Also a temperature control means 17 may be provided to regulate the temperature of diode 1 in order to vary the value of current at which the threshold of stimulated coherent emission is achieved.

Semiconductor body 1 of FIGURE 1 is generally monocrystalline and is cut in such a fashion that the front surface 11 and the rear surface 12 may be polished to exact parallelism in planes that are perpendicular to the plane of junction region 4. This parallelism is necessary in order that a standing wave pattern may be set up within the semiconductor crystal for the attainment of high efficiency coherent radiation emission. As an example of the degree of parallelism necessary, in one device constructed in accord with the present invention, it has been determined that a degree of parallelism comparable to the maintenance of the dimension of 0.5 mm. between front and rear faces to a tolerance of one-tenth micron is necessary, although this figure is given as an example only, and may vary from material to material.

The material from which the semiconductor crystal 1 is cut may be composed in general of a compound semiconductor or an alloy of compound semiconductors from the Group III–Group V (of the periodic table) class which are denominated as Direct Transition Semiconductors (adapted to direct transitions of electrons between valence and conduction bands) and may include, for example, gallium arsenide, indium antimonide, indium arsenide, indium phosphide, gallium antimonide and alloys therebetween and may further include direct transition alloys of other materials such as alloys of gallium arsenide and gallium phosphide (indirect by itself) in the range of zero to 50 atomic percent of gallium phosphide. For a further discussion of direct transition semiconductors reference is hereby made to an article by H. Ehrenreich in the Journal of Applied Physics, vol. 32, page 2155 (1961). Other suitable direct transition semiconductive materials include lead sulfide, lead selenide and lead telluride. In these materials indium is suitable as a donor and excess anions are suitable as acceptors. The wavelength of the emitted radiation depends upon the band gap (the energy difference between the conduction band and the valence band of the chosen semiconductor).

Both the N-type and the P-type regions of semiconductor crystal 1 are impregnated or doped with donor or acceptor activators, respectively, to cause degeneracy therein. As used herein, a body may be considered to be degenerate N-type when it contains a sufficient concentration of excess donor impurity carriers to raise the Fermi level thereof to a value of energy higher than the minimum energy of the conduction band on the energy band diagram for the semiconductive material. In a P-type semiconductor body or region, degeneracy means that a sufficient concentration of excess acceptor impurity carriers exists therein to depress the Fermi level to an energy lower than the maximum energy of the valence band on the energy band diagram for the semiconductive material. Degeneracy is usually obtainable when the excess negative conduction carrier concentration exceeds $10^{17}$/cc. or when the excess positive conduction carrier concentration exceeds $10^{18}$/cc. The Fermi level of such an energy band diagram is that energy at which the probability of there being an electron present in a particular state is equal to one-half.

The materials suitable for rendering degenerately N and P-type the various semiconductors with which the devices of the present invention may be constructed depend upon the semiconductive material utilized and are not necessarily the same in each case, even though the materials may be of the same class. Thus, all of the Group III–Group V periodic table compounds utilize sulfur, selenium and tellurium as donors and zinc, cadmium, mercury and magnesium as acceptors, on the other hand, the elements tin, germanium and silicon may serve either as donors or acceptors depending upon the particular semiconductor and the method of preparation. For example, in gallium antimonide grown from a stoichiometric melt they are all acceptors. In indium antimonide, tin is a donor, whereas germanium and silicon are acceptors. In the remaining direct transition semiconductors of the Group III–Group V type, Sn, Ge and Si are all donors. Any donor and acceptor pair that have sufficiently high solubilities for the material utilized to form crystal 1 may be utilized to form the degenerately impregnated or doped regions 2 and 3 in the device of FIGURE 1.

As an example of one device constructed in accord with the present invention, a device substantially as illustrated in FIGURE 1 was made of a flat wafer cut from a monocrystalline ingot of N-type gallium arsenide which had been impregnated or doped with approximately $10^{18}$ atoms per cubic centimeter of tellurium by growth from a melt of gallium arsenide containing at least $5 \times 10^{18}$ atoms per cubic centimeter of tellurium to cause it to be degenerately N-type. A P-N junction region is formed in a horizontal plane by diffusing zinc into all surfaces thereof at a temperature of approximately 1000° C. for approximately ½ hour using an evacuated sealed quartz tube containing the gallium arsenide crystal and 10 milligrams of zinc, thus producing a P-N junction region of approximately 1000 Angstroms in thickness at a distance of approximately .1 mm. below all surfaces of the crystal 1. The wafer is then cut and ground to remove all except one such planar junction. As cut, the wafer typically may be .5 mm. thick and .4 mm. x .4 mm. on its faces. The front and rear surfaces of the crystal which are perpendicular to the P-N junction are then polished to optical smoothness and to exact parallelism (in the case of the aforementioned gallium arsenide diode to a parallelism of approximately ±0.1 micron). Alternatively, parallelism may be obtained by proper cleavage of the crystal. The side surfaces 13 and 14 are cut so as to form a tapered structure as one means of precluding any possibility of transverse standing waves within the semiconductor crystal. Alternatively, they could be roughened with abrasive for the same purpose. With the aforementioned GaAs crystal, acceptor solder 6 is an alloy of 3 wt. percent zinc, the remainder being indium. Donor solder 8 is of tin.

The thickness of the junction region in crystal 1 is approximately 300 to 20,000 Angstrom units as determined from measurements of junction capacity at zero bias and preferably should be maintained at a thickness of approximately 500 to 2000 Angstroms. This thickness determines the efficiency of light generation and the threshold current for coherent light, and may determine the feasibility of operating the diode on a continuous wave basis. It also is important in determining the temperature of operation and the power output. Phenomenologically, the minimum thickness is set by practical considerations and may be any small but finite dimension which does not allow appreciable quantum mechanical tunneling under forward bias. The maximum thickness of the layer should not exceed approximately twice the longer of the two minority charge carrier diffusion lengths on either side of the intermediate or junction region.

In operation, the device of FIGURE 1 is subjected to a pulse of direct current at high current levels, as for example, of approximately 5000 to 50,000 amperes per square centimeter for a gallium arsenide diode. The pulse width to avoid overheating is conveniently kept to a level of approximately 1 to 10 microseconds. Since it has been found that the threshold for stimulated coherent light emission from a gallium arsenide diode, for example, is related to the temperature of the diode, it may be convenient to subject the diode to a low temperature to lower the threshold for coherent emission and preclude the necessity of a high current source. Thus, for example, when a diode of gallium arsenide is immersed in a Dewar of liquid air at a temperature of approximately 77° K. the threshold for coherent emission occurs at approximately 10,000 amperes per square centimeter and decreases to less than 2000 A./cm.$^2$ at 20° K. Since the junction area may conveniently be approximately .001 cm.$^2$, a 10 ampere pulsed current source is sufficient at 77° K., as is a 2 ampere source at 20° K.

In FIGURE 3 of the drawing there is shown a light output versus current density graph showing the threshold of stimulated coherent infrared light emission from a gallium arsenide diode constructed in accord with FIGURE 1 of the drawing and described hereinbefore. In region A of the curve of FIGURE 3 the light increases substantially linearly with increasing current density and is incoherent. At the incidence of portion B of the curve of FIGURE 3 the light output measured in the direction perpendicular to surface 11 suddenly increases non linearly and becomes coherent. Coherence is indicated by diffraction patterns perpendicular to the plane of the junction indicating a definite phase relationship between light emitted from different lateral portions of the P-N junction region 4 of the diode. As the current density of the pulse is increased further, the light output versus current density curve enters part C and the light output increases less rapidly again. The light, however, continues to remain coherent.

In FIGURE 4 of the drawing, curves D and E illustrate further evidence of the coherence of the light emitted from the diode of FIGURE 1. Curves D and E are drawn to different scales, and the maximum of curve E may be 20 to 50 times that of curve D. This expedient is necessary to compare the two. Curve D of FIGURE 4 is a representation of the spectral distribution of light emitted from the P-N junction region 4 of diode 1 before the threshold of coherent radiation is reached. As may be seen, the half height value of bandwidth for this spectral distribution is approximately 150 Angstrom units. Curve E represents the spectral distribution of light emitted by P-N junction region 4 of diode 1 after the threshold of coherent light emission has been achieved. As may be seen, the half-height line width is approximately 15 Angstrom units. The peak amplitude of light emitted in the coherent mode is approximately 20 to 50 times greater than in the incoherent mode. The width of the spectral distribution curve during emission of coherent stimulated light is dependent upon the mode of oscillation within the resonant cavity defined by the front and rear surfaces 11 and 12 of diode 1 and may actually consist of a single peak or several peaks depending upon the mode or the number of modes that exist. The modes which may exist in any given configuration comprise those modes of which an integral number of half wavelengths equals the length of the resonant cavity between the surfaces 11 and 12.

While the mechanism for stimulated coherent light emission from direct transition semiconductor compounds in accord with the present invention is not understood with the precision of simpler physical phenomena, the coherent stimulated emission is believed to be due to band-to-band transitions of electrons between states of similar wave number. It is not believed to be dependent upon transitions between impurity induced intra band states, although it is conceivable that such states could exist or that in other systems such states could be induced to cause impurity state or impurity state to band transitions which would also result in stimulated coherent radiation.

In the stimulated coherent radiation devices of the prior art, stimulated emission has generally been the result of at least two existing energy level states above the ground level for the excited electron (as for example, in the three-level maser) and sometimes even depends upon three levels above the ground state for the emitting electron (the four-level maser). Radiation is the result of two input frequencies, namely the pump frequency and the signal frequency. The energy of the pump frequency causes electrons to be raised from the ground state to a high level after which they, a finite time later, descend into a metastable state with a fairly long lifetime. After a sufficient number of electrons have been raised from the ground state and have subsequently descended to the metastable state there may exist a population inversion in which empty states exist in the ground state and a high concentration of electrons exist in the metastable state. At this time, a signal frequency having energy equal to the energy difference between the metastable state and the ground or immediately lower state will trigger a down-transition from a metastable state to the ground or immediately lower state. If a resonant cavity is provided so that a standing wave exists the radiation emitted by the down-transition stimulates further down-transitions and causes a large number of transitions and a correspondingly large number of quanta of radiation which is in phase and, hence, coherent.

If an exact analogy were drawn between these and the semiconductor stimulated coherent emitters of the present invention, the coherent emission of the latter would be between impurity states located between the conduction and valence bands. Such is believed not to be the case, however. In the case of the coherent stimulated emission devices of the present invention, transitions are believed to occur from a degenerate N-type region to a degenerate P-type region in which a popula- inversion occurs by virtue of an overlapping of a region of filled states in the N-type region and a region of empty states in the P-type region. This "population inversion" is produced by application of a large forward bias and as a result of the degeneracy of the N and P-type regions of the devices of the present invention and the thinness of the intermediate P-N junction region.

In accord with the invention, the emitted radiation quanta are of at least the energy of the band gap characteristic of the semiconductor of which the diode is formed and are triggered to emission by the presence of a quantum of energy at least as large in value as the value of the band gap of the semiconductor. Such a quantum may result initially from the spontaneous emission represented by curve D of FIGURE 4, which is always present to some degree. It is important to note at this point that, while the transition of an electron from a filled state in the conduction band to an empty state in the valence band results in the emission of an energy quantum of approximately the band gap energy, the original quantum or photon is not destroyed but continues in existence, since there is no dissipative absorption of energy. It should be noted further that the band gap of the semiconductor may be decreased appreciably, compared with that of the pure semiconductor, by the presence of the high concentration of impurities required to render the regions degenerate in accord with well known behavior of heavily doped semiconductors.

As in other stimulated emission devices, the intensity of coherent radiation is increased by causing a standing wave pattern to exist within a resonant cavity. In the device of FIGURE 1 the resonant cavity constitutes the junction region 4 of the body of the direct transition Group III-VI semiconductor, as for example, gallium arsenide crystal and the immediately adjoining portions of regions 2 and 3 between the front faces and the back faces. Since these faces are polished to optical smoothness, the reflectance of the surfaces is high, of the order of .4, or higher and a substantial fraction of the infrared light photons emitted by down-transitions are reflected back through the junction region causing the further triggering of down-transitions until the emission of infrared photons rises sharply as on portion 3 of the curve in FIGURE 3 of the drawing. Partial metallizing of faces 11 and 12 may also be done in those cases in which the reflectivity of the polished surface is insufficient. Additionally, if emission from one surface only is desired one surface may be heavily reflectively coated to make it a substantial reflector. Alternatively, reflecting mirrors may be placed parellel to surfaces 11 and 12 to enhance the resonance properties of the junction structure.

When a standing wave pattern has been established within the junction region of a gallium arsenide diode constructed as in FIGURE 1, a substantial portion of the infrared light is transmitted through the polished front and rear surfaces and a high intensity monochromatic light pulse, as indicated by curve E of FIGURE 4 of the drawing, is obtained. The stimulated coherent radiation of devices in accord with the present invention, and specifically the emission of coherent infrared radiation from a gallium arsenide crystal as described hereinbefore, is favored by the large probability of band-to-band recombination as compared with that for free carrier absorption in gallium arsenide (and other direct transition compound semiconductors) and by the fact that the energy of the emitted radiation is below the absorption threshold of the degenerate material bounding the junction region 4. By proper choice of the material, of which the diode is made, as for example, by allowing similar materials have different band gaps, it is possible to "tailor" the band gap to achieve light or other radiation of a desirable wavelength. Thus, for example, coherent visible light emission has also been achieved from a gallium arsenidephosphide complex compound having an approximate formula of $Ga(As_{1-x}P_x)$ where $x$ is approximately .4 having an impurity concentration in both regions of approximately $2\times10_{18}$ carriers per cubic centimeter. Light radiated from this junction is sharply peaked at approximately 7100 Angstrom units and has a bandwidth of approximately 20 Angstrom units at 16,000 amp./cm.$^2$ and approximately 12 Angstrom units at 19,000 amp./cm.$^2$ current density.

While the configuration of FIGURE 1 is illustrative of one embodiment of the invention, many other configurations are possible. The essential features are degenerately doped P and N-type regions with a very thin interposed region in which population inversion may be obtained and which locates a resonant cavity for the standing waves. While in the above-described embodiment, this region is a P-N junction region, which is the easiest such region to obtain, it could advantageously be an interposed I-type region, resulting in a P-I-N structure. Such a structure could be obtained by producing a degenerate N-type crystal (as 3 in FIGURE 1), then growing, by epitaxial growth techniques, a controllably thin I-type region (as 4 in FIGURE 1), and thereafter growing, by epitaxy, a degenerate P-type region (as 2 in FIGURE 1) thereupon. Cutting and polishing of the crystal would be as before. In this embodiment, the I-type region may be actually intrinsic or may be either weakly P-type or N-type. As a matter of fact, any excess conduction carrier concentration which is a factor of 10 or more less than that contained in the degenerate N and P-type regions is suitable, so long as the region is of a thickness of approximately 300 A.U. to 20,000 A.U. This dimension is substantially independent of the material of which the diode is formed.

Alternative geometries are also within the scope of the invention. For example, the rectangular geometry of FIGURE 1 may be replaced by the cylindrical geometry of FIGURE 6 in which like parts are given like numerals. In this case the resonant cavity is located by cylindrical region 4 and light is emitted radially.

As a further alternative, the geometry of FIGURE 7 may be utilized. In this case the resonant cavity is hollow and cylindrical. Radiation is emitted along the annular cross-sectional end of the cavity. Other well known resonant cavity structures may also be utilized in accord with the invention.

For purposes of description of such configurations as that set forth in FIGURE 6, (in which the standing wave has a radial mode or pattern) as well as more complex configurations in which, for example, the cross section may be elliptical and the standing wave pattern may be much more complex, and of FIGURE 7, in which the pattern is more simple but the intermediate section has an annular cross section, the following criteria will be used.

At least two surface portions should be paralleled with one another and reflective. This condition should obtain at least in the region of intersection with the intermediate region).

The surface portions which support the standing wave pattern should be perpendicular to the intermediate region at least at the point of intersection therewith. (Even if only in the sense that a curved surface may be perpendicular to a line at the point of intersection if the tangent to the surface is perpendicular to the line at that point).

The intermediate region which locates the standing wave must be of such a configuration as to pass the standing wave in a straight line between reflecting surface portions. This configuration will be denominated herein as "linear in at least one direction."

Advantages of the stimulated emission coherent radiation devices in accord with the present invention over other solid state and gas stimulated emission devices are many. Whereas other devices require pumping with microwave frequencies or intense visible or infrared light, the pumping of the devices of the present invention is entirely electrical and preferably is achieved by the application of a suitable direct current pulse to the diodes. This permits utilization of extremely simple auxiliary equipment, as opposed to the highly complex and expensive auxiliary equipment necessary for other stimulated emission devices. Possibly the greatest advantage of the stimulated emission coherent radiators of the present invention lies in their efficiency. Current efficiencies of greater than 50% have been observed and power efficiences of approximately 20% to 30% have been observed. With further development and a better understanding of the basic phenomena involved, it is expected that the efficiency of conversion of electricity into stimulated coherent emission, as for example, visible or infrared light, will closely approach 100%.

Similarly, it is readily seen that a coherent amplifier may be obtained by maintaining the bias at a value just below the threshold of coherent emission, so that a proper pulse or signal of low energy stimulates the emission of high power coherent radiation.

A further advantage of the invention relates to lasers (sources of coherent stimulated light) constructed in accord with the invention. Lasers have not yet found great use largely because of the difficulty in modulating the output light. Light output from lasers constructed in accord with the present invention may readily be modulated. Amplitude modulation is readily obtained by varying the value of the current or current density to which the stimulated emission diode is subjected. Frequency modulation may be obtained by subjecting the diode to magnetic fields or to elastic stress, or by varying the separation of the aforementioned reflecting mirrors which may be placed parallel to surfaces 11 and 12. Another means by which modulation may be obtained is by the incorporation onto the same crystal body, as which constitutes the diode of the invention, of a piezo-electric transducer so that electric pulses can elastically stress the diode crystal.

It will be appreciated that, although I have described specific embodiments of the invention, many modifications may be made, and I intend by the appended claims to cover all such modifications as fall within the true spirit and scope of the invention.

What I claim as new and desire to secure by Letters Patent of the United States is:

1. A stimulated coherent emission semiconductor device comprising: a monocrystalline body of a direct transition compound semiconductive material; a first region within said body having degenerate N-type conductivity characteristics; a second region within said body having degenerate P-type conductivity characteristics; a third region having a thickness no greater than approximately twice the larger of the two diffusion lengths for minority charge carriers in the respective N and P-type regions, said third region being located between and contiguous with said first and second regions and having conductivity characteristics intermediate the conductivity characteristics of said first and second regions; at least two surface portions of said body being exactly parallel with each other, exactly perpendicular to said third region at the intersection therewith and of sufficiently high reflectivity to permit a standing wave of electromagnetic energy to be established between said two surface portions through substantially said third region; contact means making non-rectifying electrical contact with each of said first and second regions; and means for applying a direct current to said body sufficient to bias the region between said first and second regions in the forward direction to cause a band-to-band population inversion in said intermediate region and the emission of stimulated coherent radiation due to band-to-band transitions through at least one of said surface portions.

2. A stimulated coherent emission semiconductor device comprising: a monocrystalline body of a direct transition compound semiconductive material; a first region within said body having degenerate N-type conductivity characteristics; a second region within said body having degenerate P-type conductivity characteristics; an intermediate region located between and contiguous with said first and second regions having a thickness no greater than approximately twice the larger of the two diffusion lengths for minority charge carriers in the respective N and P-type regions and having a conductivity characteristic corresponding to a concentration of excess charge carriers within the range of at least a factor of ten times less excess P-type carriers than is present in the second region to at least a factor of ten less excess N-type carriers than is present in the first region; at least two surface portions of said body being exactly parallel with each other, exactly perpendicular to said third region at the intersection therewith and of sufficiently high reflectivity to sustain a standing wave of electromagnetic energy between said portions and including substantially said third region; contact means making non-rectifying electrical contact with each of said first and second regions; and means for applying a direct current to said body sufficient to bias the region between the said first and second regions in the forward direction to cause a band-to-band population inversion in said intermediate region and coherent radiation due to band-to-band transitions to emerge through at least one of said surface portions.

3. A stimulated coherent emission semiconductor device comprising: a monocrystalline body of a direct transition compound semiconductive material; a first region within said body having degenerate N-type conductivity characteristics; a second region within said body having degenerate P-type conductivity characteristics; a planar P-N junction region having a thickness no greater than approximately twice the larger of the two diffusion lengths for minority charge carriers in the respective N and P-type regions located intermediate and contiguous with said first and second regions; at least two surface portions of said body being exactly perpendicular to the plane of said P-N junction region and exactly parallel to each other to permit a standing wave of electromagnetic energy to be established between said two surface portions through substantially said junction region; contact means making non-rectifying contact with each of said first and second regions; and means for applying a direct current to said body sufficient to bias said junction region in the forward direction to cause a band-to-band population inversion in said junction region and the emission of stimulated coherent radiation due to band-to-band transitions through at least one of said surfaces.

4. A stimulated coherent emission semiconductor device comprising: a monocrystalline body of a direct transition compound semiconductive material; a first region within said body having degenerate N-type conductivity characteristics; a second region within said body having degenerate P-type conductivity characteristics; a substantially hollow cylindrical intermediate region having a thickness between its inner and outer surfaces no greater than approximately twice the longer of the two diffusion lengths for minority charge carriers in the respective N and P-type regions located intermediate and contiguous with said first and second regions; a pair of surface portions exactly parallel with one another and exactly perpendicular with respective portions of said junction at the intersection therewith and having a sufficiently high reflectivity as to support a standing wave of electromagnetic energy to be established substantially within said intermediate region and between said surfaces; contact means making non-rectifying contact with each of said first and second regions; and means for applying a direct current to said body sufficient to bias said intermediate region in the forward direction to cause a band-to-band population inversion therein and the emission of stimulated coherent radiation due ot band-to-band transitions through at least one of said surfaces.

5. A stimulated emission semiconductor device comprising: a substantially right cylindrical monocrystalline body of a direct transition compound semiconductive material; a first region within said body having degenerate N-type conductivity characteristics; a second region within said body having degenerate P-type conductivity characteristics; a third substantially hollow right cylindrical shaped region having a thickness between its inner and outer surfaces no greater than approximately twice the longer of the two diffusion lengths for minority charge carriers in the respective N and P-type regions located intermediate and contiguous with said first and second regions and having a conductivity corresponding to a concentration of excess charge carriers within the range of at least a factor of ten less excess P-type carriers than is present in the second region to at least a factor of ten less excess N-type carriers than is present in the first region; at least a portion of the surface of said substantially cylindrical body perpendicular to said third region having a reflectivity sufficiently high as to support a standing wave of electromagnetic energy within substantially said third region; contact means making non-rectifying contact with each of said first and second regions; and means for applying a direct current to said body sufficient to bias said regions in the forward direction to cause a band-to-band population inversion and the emission of stimulated coherent radiation due to band-to-band transition through at least a portion of the exterior surface of said body.

6. A stimulated coherent emission semiconductor device comprising: a monocrystalline body of a direct transition compound semiconductive material of substantially cylindrical configuration; a first region within said body having degenerate N-type conductivity characteristics; a second region of said body having P-type degenerate conductivity characteristics; a third planar region having a thickness no greater than approximately twice the larger of the two diffusion lengths for minority charge carriers in the respective N and P-type regions, said third region being contiguous with and intermediate said first and second regions, perpendicular to the exterior lateral surface of said cylinder and having conductivity characteristics intermediate the conductivity characteristics of said first and second regions; at least a sufficient portion of the exterior surface of said body including said third region having a high enough reflectivity to support a standing wave of electromagnetic energy within said body and including substantially said third region; contact means making non-rectifying contact with each of said first and second regions; and means for applying a direct current to said body sufficient to bias said junction region in the forward direction to cause a band-to-band population inversion therein and the emission of stimulated coherent radiation due to band-to-band transitions through at least a portion of said surface.

7. A stimulated coherent emission semiconductor device comprising: a monocrystalline body of a direct transition compound semiconductor material of a substantially right circular cylindrical configuration; a first region within said body having degenerate N-type conductivity characteristics; a second region within said body having P-type degenerate conductivity characteristics, a third planar region having a thickness no greater than approximately twice the larger of the two diffusion lengths for minority charge carriers in the respective N and P-type regions, said third region being contiguous with and intermediate first and second regions, perpendicular to the axis of rotation of said cylindrical body and having conductivity characteristics corresponding to a concentration of excess charge carriers within the range of at least a factor of ten less excess P-type carriers that is present in the second region to at least a factor of ten less excess N-type carriers that is present in the first region; at least a sufficient portion of the exterior surface of said body including said third region having a sufficiently high reflectivity to support a standing wave of electromagnetic energy within said body and including substantially said third region; contact means making non-rectifying electrical contacts to said first and second regions; and means for applying a direct current to said body sufficient to bias said third region in the forward direction to cause a band-to-band population inversion therein and the emission of stimulated coherent radiation due to band-to-band transitions through at least a portion of said surface.

8. A stimulated coherent emission semiconductor device comprising: a monocrystalline body of a direct transition semiconductive material; a first region within said body having degenerate N-type conductivity characteristics; a second region within said body having degenerate P-type conductivity characteristics; a third planar region having a thickness no greater than approximately twice the larger of the two diffusion lengths for minority charge carriers in the respective N and P-type regions, said third region being located between and contiguous with said first and second regions and having conductivity characteristics falling within the range corresponding to a concentration of excess charge carriers within the limits of at least a factor of 10 less excess P-type carriers than is present in the second region to at least a factor of 10 less excess N-type carriers than is present in the first region; a pair of major surfaces of said body being exactly parallel to each other, exactly perpendicular to the plane of said third region and of high enough reflectivity so as to permit a standing wave of electromagnetic energy to be established between said two parallel surfaces through substantially said third region; contact means making non-rectifying electrical contact with each of said first and second regions; and means for applying a direct current through said body sufficient to bias the region between said first and second regions in the forward direction to cause a band-to-band population inversion therebetween and the resultant emission of stimulated coherent radiation due to band-to-band transitions through at least one of said parallel surfaces.

9. A stimulated coherent emission semiconductor device comprising: a monocrystalline body of gallium arsenide; a first region within said body doped to degeneracy and containing an excess of doner activator impurities in excess of approximately $2\times10^{17}$ per cubic centimeter; a second region within said body doped to degeneracy and containing an excess of acceptor activator impurities in excess of approximately $2\times10^{17}$ per cubic centimeter; a planar P-N junction region therebetween having a thickness of approximately 300 Angstrom units to 20,000 Angstrom units; at least two surface portions of said body being exactly parallel with one another, perpendicular with the plane of said P-N junction at the intersection therewith and having a sufficiently high reflectivity as to sustain a standing wave of electromagnetic energy therebetween and including substantially said P-N junction region; contact means making non-rectifying contact with each of said first and second regions; and means for applying a direct current to said body sufficient to bias said junction region in the forward direction to cause a band-to-band population inversion therein and the emission of stimulated coherent radiation due to band-to-band transitions through at least one of said surfaces.

10. A stimulated coherent emission semiconductor device comprising: a monocrystalline body of a mixed compound semiconductive material having the general formula $Ga(As_{1-x}P_x)$ where $x$ may vary from 0 to 0.5; a first region of said body doped to N-type degeneracy and containing an excess of donor activator impurities of at least approximately $5\times10^{17}$ per cubic centimeter; a second region of said body doped to P-type degeneracy and containing a concentration of excess acceptor activator impurities of at least approximately $2\times10^{18}$ per cubic centimeter; a planar P-N junction region therebetween having a thickness of 300 Angstrom units to 20,000 Angstrom units; at least two surface portions of said body being exactly parallel with one another, being perpendicular with the plane of said P-N junction at the intersection therewith and having sufficiently high reflectivity as to sustain a standing wave of electromagnetic energy therebetween and including substantially said P-N junction region; contact means making non-rectifying contact with each of said first and second regions; and means for applying a direct current to said body sufficient to bias said junction region in the forward direction to cause a band-to-band population inversion therein and the emission of stimulated coherent radiation due to band-to-band transitions through at least one of said surfaces.

References Cited by the Examiner

UNITED STATES PATENTS

| | | | |
|---|---|---|---|
| 2,890,976 | 6/1959 | Lehovec | 148—171 |
| 3,059,117 | 10/1962 | Boyle et al. | 88—61 |
| 3,102,201 | 8/1963 | Braustein et al. | 88—61 |
| 3,121,203 | 2/1964 | Heywang | 88—61 |
| 3,131,096 | 4/1964 | Sommers | 317—237 |

OTHER REFERENCES

Benoit et al.: "Les Semiconductuers et Leur Utlisation Possible Dans Les 'Lasers'," J. Physique et le Radium, vol. 22, No. 12, pp. 834–836, December 1961.

Bernard et al.: "Laser Conditions in Semi-Conductors," Physica Status Solidi, vol. 1, 1961, pp. 699–703.

Bernard et al.: "Possibilities de Lasers a Semiconducteurs," Id. at pp. 836 and 837.

Dumke: "Interband Transitions and Maser Action," Physical Review, vol. 127, No. 5, September 1, 1962, pp. 1559–1563.

Folberth: "Mischkristallbildung bei $A^{III}B^{V}$ Verbindungen," Zeitschrift fur Naturforshung, Band 10*a*, Heft 6, 1955, pages 502 and 503.

Nasledov et al.: "Recombination Radiation of Gallium Arsenide," Soviet Physics Solid State, vol. 4, No. 4, October 1962, pp. 782–784 (Translated from Fizika Tverdogo Tela, vol. 4, No. 4, April, 1962, pp. 1062–1065; in Russian).

Nathan et al.: "Stimulated Emission of Radiation from GaAs p-n Junctions," Applied Physics Letters, vol. 1, No. 3, November 1, 1962, pp 62–64.

Quist et al.: "Semiconductor Maser of GaAs," Applied Physics Letters vol. 1, No. 4, December 1, 1962, pp. 91 and 92.

JEWELL H. PEDERSEN, *Primary Examiner.*

FREDERICK M. STRADER, *Examiner.*

J. L. CHASKIN, R. L. WIBERT, *Assistant Examiners.*

UNITED STATES PATENT OFFICE
CERTIFICATE OF CORRECTION

Patent No. 3,245,002 April 5, 1966

Robert N. Hall

It is hereby certified that error appears in the above numbered patent requiring correction and that the said Letters Patent should read as corrected below.

Column 1, line 44, for "particularly" read -- particularity --; column 5, line 45, for "popula-" read -- population --; column 6, line 40, for "material," read -- material --; line 41, for "allowing" read -- alloying --; column 6, line 42, for "have" read -- having -- line 49, for "$2x10_{18}$" read -- $2x10^{18}$ --; column 7, line 27, for "This" read -- (This --; column 9, line 47, for "ot" read -- to --; column 10, line 35, for "characteristics," read -- characteristics; --; column 11, line 16, for "doner" read -- donor --; column 11, line 20, for "$2x10^{17}$" read -- $10^{18}$--.

Signed and sealed this 26th day of September 1967.

(SEAL)
Attest:

ERNEST W. SWIDER
Attesting Officer

EDWARD J. BRENNER
Commissioner of Patents